United States Patent Office 3,808,284
Patented Apr. 30, 1974

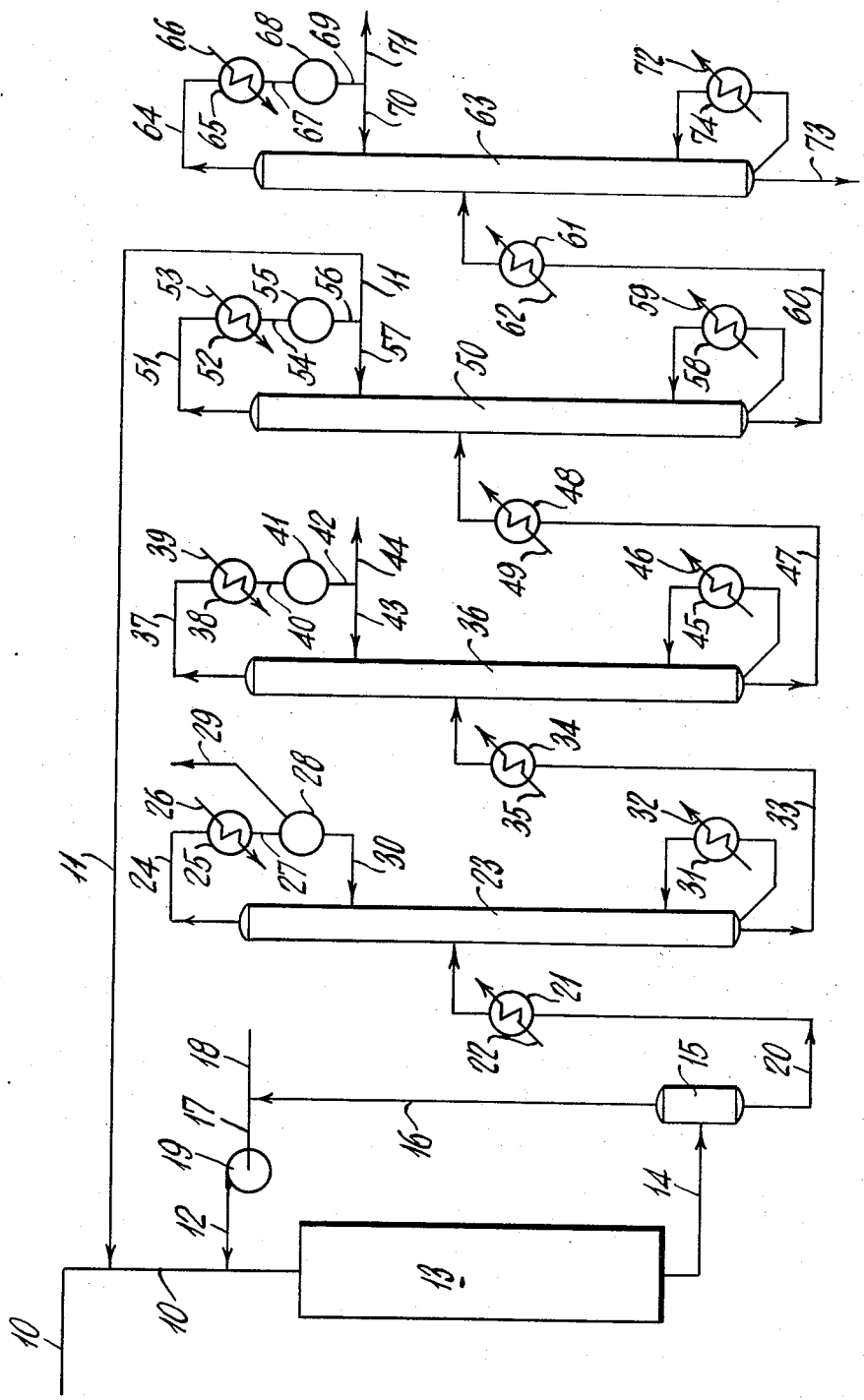

3,808,284
PROCESS FOR DISPROPORTIONATING HYDROCARBONS
Richard C. Wallace, Blackwood, N.J., and Robert M. Suggitt, Wappingers Falls, N.Y., assignors to Texaco Inc., New York, N.Y.
Filed Sept. 11, 1972, Ser. No. 287,930
Int. Cl. C07c 3/62
U.S. Cl. 260—672 T      11 Claims

ABSTRACT OF THE DISCLOSURE

The method of this invention permits disproportionation of toluene to form a product stream containing benzene and the recovery of this product in high purity.

FIELD OF THE INVENTION

This invention relates to a method of disproportionating toluene. More particularly, it relates to a method of converting toluene to high purity benzene.

DESCRIPTION OF THE PRIOR ART

As is well known to those skilled in the art, alkyl aromatics such as methyl benzenes, typified by toluene, have been disproportionated over various catalysts to produce a product stream containing, for example, benzene and xylene. Both the lighter benzene stream and the heavier xylene stream contain impurities most commonly including naphthenes and ethyl aromatics. The naphthenes may typically include methyl cyclopentane, cyclohexane, dimethyl cyclopentane, etc. The ethyl aromatics most commonly present may include ethyl benzene in the $C_8$ fraction and ethyl toluenes in the $C_9$ fraction.

These impurities are undesirable in that they require substantial processing to remove. For example, the separation of benzene from the naphthene fraction (which treatment is necessary to produce high quality benzene (may require extensive fractionation because inter alia the reported boiling point of benzene is 80.1° C. and the reported boiling point of cyclohexane is 80.75° C.

It is an object of this invention to provide a method of disproportionating a hydrocarbon. It is another object of this invention to convert toluene to benzene. Other objects will be apparent to those skilled in the art.

BRIEF SUMMARY OF THE INVENTION

In accordance with certain of its aspects, the method of this invention for disproportionating toluene may comprise contacting said toluene, admixed with a sulfide compound, under disproportionation conditions in the presence of, as disproportionation catalyst (a) a mordenite-derived hydrogen aluminosilicate having a silica to alumina mole ratio of greater than about 10 to 1, and (b) a sulfide Group VIII metal associated with the aluminosilicate;

maintaining said toluene in contact with said catalyst for a contact time of less than about 20 seconds during disproportionating thereby effecting conversion of greater than 70% of the theoretical conversion of charge toluene to product benzene substantially free of naphthenes boiling within the boiling range of said desired product benzene; and recovering said product benzene substantially free of naphthenes.

DETAILED DESCRIPTION OF THE INVENTION

The charge compound which may be disproportionated in accordance with practice of the method of this invention may be toluene either substantially pure or more typically in a benzene-toluene-xylene refinery stream.

It will be apparent to those skilled in the art that the charge to the disproportionation operation, will be converted to a higher methyl benzene (i.e., a benzene bearing a greater number of methyl groups) and to a lower methyl benzene (i.e., a benzene bearing a lesser number of methyl groups than the charge methyl benzene which latter bears an intermediate number of methyl groups). In the preferred embodiment, the charge methyl benzene may be a toluene; and this may be disproportionated to form a product containing a higher methyl benzene (e.g. xylene) and a lower methyl benzene (e.g. benzene se). For purposes of convenience, this disclosure will refer to toluene as the charge stream and benzene will be the principal desired product recovered therefrom.

A typical charge stream which may be treated in practice of the process of this invention may be a toluene-containing stream from a catalytic reforming operation. Preferably, this charge stream, prior to disproportionation, may be subjected to various processing operations to remove non-aromatics, benzene, and $C_8$ and higher components. The preferred charge to disproportionation may thus be essentially toluene.

Disproportionating of the charge toluene-containing stream, may be effected by passing 200–4000 parts, say 1000 parts, of charge toluene in vapor phase and hydrogen in an amount of 0.5–10, say 4, moles of hydrogen per mole of hydrocarbon over a disproportionation catalyst at 50–2000 p.s.i.g., say 800 p.s.i.g.

It is a feature of the process of this invention that the disproportionation catalyst which may be employed may be one containing (a) a mordenite-derived hydrogen aluminosilicate, i.e. a hydrogen aluminosilicate derived by increasing the silica to alumina mole ratio of mordenite to greater than 10 to 1 and (b) a sulfided Group VIII metal associated with the aluminosilicate. Typical of such catalyst may be those disclosed in U.S. Pat. 3,476,821 which issued Nov. 4, 1969 to Texaco Inc. as assignee of John T. Brandenburg, John M. Crone, Jr., and Robert M. Suggitt.

The preferred disproportionation catalyst which may be employed may be a composite catalyst comprising (i) hydrogen mordenite having a silica to alumina mole ratio greater than about 10:1, (ii) alumina, and (iii) a sulfided Group VIII metal. Typical of such catalysts may be those disclosed and claimed in application Ser. No. 253,555 for Conversion of Alkylaromatics (71,907), filed May 15, 1972 by John T. Brandenburg, Robert M. Suggitt, and Thomas M. Liden (assigned to Texaco Inc.) During disproportionation, a sulfide such as a mercaptan, methyl disulfide, or preferably hydrogen sulfide may be present in amount of 5–100, say $20 \times 10^{-4}$ moles of $H_2S$ per mole of hydrogen.

Typically, the catalyst may contain:

(a) 5–88 parts, say 70 parts, of acid-leached mordenite typically having a $SiO_2:Al_2O_3$ molar ratio of 12–80:1, preferably 25–50:1, on which is deposited (b) 2–10 parts, say 7 parts, of nickel or cobalt as sulfide, yielding 4–8 parts of nickel or cobalt metal, the e.g. cobalt on mordenite being admixed with (c) 10–85 parts, preferably 15–30 parts, say 15 parts, of preferably an alumina gel matrix.

It has unexpectedly been found that the desired disproportionation of toluene to benzene may be carried out to yield a product stream substantially free of naphthenes boiling within the boiling range of the desired product benzene e.g. the range of 150° F.–200° F. This is effected by carrying out the disproportionation under controlled conditions including weight hourly space velocity, temperature, pressure, hydrogen to hydrocarbon mole ratio and more particularly by control of contact time and percent conversion of toluene to benzene.

It is a particular feature of the process of this invention that the contact time between the toluene charge and the catalyst be less than about 20 seconds. Typical contact times may be 7–20 seconds, preferably 10–19 seconds, say 17 seconds. It will be apparent to those skilled in the art that the charge toluene is converted to products as it contacts the catalyst. Accordingly the contact time is calculated by dividing the volume of the catalyst by the volumetric rate of flow of the charge toluene at the pressure and temperature of operation—the toluene gas being treated as an ideal gas. The temperature and the pressure employed in this calculation are the arithmetic averages in the bed.

The weight hourly space velocity (WHSV), defined as the weight per hour of charge material per weight of catalyst, may in practice of the process of this invention preferably be maintained greater than about 4 typically 4.5–15, preferably 4.5–12, say 10.4.

The temperature (i.e. the average bed temperature) of disproportionation as carried out in practice of the process of this invention should be greater than about 600° F., and typically 600° F.–800° F. Particularly advantageous results may be achieved when the temperature is 620°–760° F., say 700° F.

In the preferred practice of the process of this invention, the pressure of operation may be 50–2000 p.s.i.g., preferably, 300–1000 p.s.i.g., typically 600–900 p.s.i.g., say 800 p.s.i.g.; and the mole ratio of hydrogen to hydrocarbon may be maintained at greater than about 4, commonly 4–15 preferably 4–10, say 4–5.

Disproportionation may be controlled by maintaining the conditions as noted to obtain the noted contact time and to effect conversion of greater than 70% and typically 70%–95% of the theoretical conversion of the toluene. If complete equilibrium were obtained by passage of toluene over a disproportionation catalyst, the product would contain about 42% toluene and 58% of other products at temperatures within the operating range. Conversion, as the term is used in this specification, is calculated as follows:

$$\text{Conversion} = \frac{100 - T}{100 - E_T} \times 100$$

wherein $E_T$ is the percentage by weight of toluene which would be present in the product at equilibrium at the temperature of operation ($E_T$ being commonly about 42%); and T is the percentage by weight of toluene actually present in the product in a particular reaction.

It is unexpectedly found, by use of the noted conditions to effect conversion of toluene to benzene at the high conversions indicated, that the product benzene stream is characterized by an unexpectedly high degree of purity. Typically, it may be substantially free of naphthenes boiling in the boiling range of benzene. Under preferred operating conditions, the benzene product stream recovered from disproportionation may contain 0.1%–0.2% or less of naphthenes boiling in the 150° F.–200° F. range.

The particular combination of temperature and WHSV to yield the desired contact time may be readily determined for a charge toluene by laboratory techniques. It may be found that a higher WHSV may be used at a higher temperature and a lower WHSV may be used at a lower temperature to achieve the desired conversion.

The disproportionation product stream may typically contain as the major components benzene, toluene, and higher methyl benzenes including xylenes.

It is a feature of the process of this invention that it permits disproportionation under conditions which yield a disproportionation product stream which is substantially free of components, typically naphthenes and paraffins, boiling in the benzene range, e.g. 150° F.–200° F. It appears that this may be because the very short contact time and high degree of toluene conversion may permit conversion, as by hydrocracking, of naphthenes and paraffins boiling in this range to yield products boiling outside this range. This permits ready recovery of benzene meeting most severe specifications (e.g. containing less than 0.2% and commonly less than 0.1% naphthenes).

In the case of toluene disproportionation, for example, a disproportionation product stream may contain (ex hydrogen):

TABLE I

| Component | Range, wt. percent | Typical wt. percent |
|---|---|---|
| Benzene | 17.0–26.5 | 23.0 |
| Toluene | 41.7–59.5 | 45.3 |
| C$_8$ Aromatics | 20.5–26.0 | 25.8 |
| C$_9$ Aromatics | 2.0–5.3 | 5.2 |
| C$_{10}$ Aromatics | 0.0–0.5 | 0.3 |
| Naphthenes, total | 0.00–0.05 | 0.028 |
| 150° F.–200° F. fraction (ex benzene) | <0.25 | 0.12 |
| Light ends (C$_3$, C$_4$ paraffins) | 0.00–0.5 | 0.37 |

In practice of the process of this invention, the disproportionation product stream may be condensed and withdrawn from the disproportionation operation and preferably passed to high pressure separation operation wherein hydrogen and hydrogen sulfide are flashed off. The hydrogen and hydrogen sulfide may be recovered; and these gases may be recycled to fresh make-up hydrogen and hydrogen sulfide, compressed to disproportionation pressure and passed to the disproportionation operation.

The flashed disproportionation product stream, in amount of 200–4000 parts, say 1000 parts, may be heated and passed to a degassing operation, wherein remaining gas (e.g. hydrogen propane, butanes, and hydrogen sulfide) are stripped from the flashed stream.

In one embodiment, the degassing operation may be carried out in a distillation tower, the overhead from which may be condensed. The liquid condensate may be returned to the distillation tower and the non-condensed gases withdrawn.

The degassing operation bottoms, in amount of 200–4000 parts, say 1000 parts, may in one preferred embodiment include 187 parts of benzene 564 parts of toluene, 210 parts of C$_8$ aromatics, 39 parts of C$_9$ and heavier, and 0.3 part of naphthenes and paraffins boiling in the benzene boiling range of 150° F.–200° F.

This degassed bottoms may be fractionated in a benzene fractionation operation to yield as overhead, preferably at atmospheric pressure and 80.1° C., 187 parts of benzene containing less than 0.25% impurities. Commonly, it may be possible by the process of this invention to so obtain benzene product of a purity greater than 99.75% and, under preferred conditions, of purity greater than 99.90%.

Benzene fractionator bottoms containing typically 417–597 parts, say 564 parts toluene; 205–260 parts, say 210 parts of C$_8$ aromatics; 20–53 parts, say 38 parts of C$_9$ aromatics; and 0–5 parts, say 1 part of C$_{10}$ aromatics may be withdrawn and passed to toluene fractionator.

Toluene may be withdrawn at 110.6° C. as overhead from the toluene fractionator; one portion may be passed as pumped reflux to the toluene fractionator and 564 parts may be withdrawn and recycled to disproportionation.

Bottoms from toluene fractionation may typically contain 205–260 parts, say 210 parts of C$_8$ aromatics; 20–53 parts, say 38 parts of C$_9$ aromatics; and 0–5 parts of C$_{10}$ and heavier may be withdrawn and passed to xylene fractionator.

These bottoms may be fractionated in C$_8$ aromatic fractionator to yield 20–58 parts, say 39 parts of C$_8$ aromatic fractionator bottoms containing 20–53 parts, say 3 parts of C$_9$ and 0–5 parts, say 1 part of C$_{10}$ and heavier. Overhead at 145° C. may include 205–260 parts, say 210 parts of C$_8$ aromatics.

It will be apparent to those skilled in the art that the novel process of this invention may be characterized by several desiderata which permit attainment of operations characterized by a high degree of efficiency.

DESCRIPTION OF THE PREFERRED EMBODIMENTS

Practice of the process of this invention may be apparent to those skilled in the art from inspection of the following description of preferred embodiments, wherein, as elsewhere in this specification, all parts are parts by weight unless otherwise noted.

In each of Examples 1-7, a toluene charge was disproportionated over a typical disproportionation catalyst—a mixture of alumina and a cobalt and aluminum-impregnated mordenite prepared as follows:

2000 parts of a commercially available sodium mordenite powder, having an average particle size of about 10-30 microns and comprising 6.86% $Na_2O$, 10.2% $Al_2O_3$, 68.2% $SiO_2$, and having a $SiO_2/Al_2O_3$ mole ratio of 11.4/1, was acid leached with 4000 parts of 6 N HCl for 24 hours at a temperature of 130-140° F. The acid was decanted and the solids washed three times with 4000 parts of hot water and three times with 4000 parts of cold water which provided a product comprising 0.95% $Na_2O$, 6.9% $Al_2O_3$, 86.1% $SiO_2$, and a $SiO_2/Al_2O_3$ mole ratio of 21.2/1. The acid leaching was again repeated, the product was washed free of chloride ion, dried at 300° F. and calcined to a temperature of 1000° F. in a stream of dry air. The final acid-leached mordenite consisted of 0.09% $Na_2O$, 3.74% $Al_2O_3$, 88.2% $SiO_2$, and a $SiO_2/Al_2O_3$ mole ratio of 40/1.

410 parts of the acid leached mordenite was impregnated with 250 parts of a cobalt nitrate solution containing 125 parts of $Co(NO_3)_2 \cdot 6H_2O$; and the impregnated powder was dried for 16 hours at a temperature of 130 to 140° F.

368 parts of $Al_2(SO_4)_3 \cdot 18H_2O$ were dissolved in 3000 parts of distilled water; and 300 parts of concentrated ammonium hydroxide were added to effect precipitation of aluminum hydroxide. The precipitate was recovered by filtration and washed 3 times with distilled water. The cobalt impregnated acid leached mordenite was mixed with the wet hydrated alumina precipitate and passed through a mill to effect homogeneous mixing. After partially drying the mixture at a temperature of 130 to 140° F. for 16 hours and extruding into $1/16$ inch pellets, the pellets were dried at room temperature for 16 hours, at 130 to 140° F. for 8 hours, at 300° F. for 16 hours and finally calcined at 1000° F. for 2 hours in dry air. The calcined catalyst pellets were sulfided at 700° F. for 4 hours with hydrogen sulfide. The recovered sulfided catalyst consisted of 4.4% cobalt, 15% gamma alumina, and the remainder hydrogen mordenite having a $SiO_2/Al_2O_3$ mole ratio of 40/1. The composite catalyst had an average crush strength of 20 pounds as determined by using a Chatillon crush strength tester.

In each run, the toluene was disproportionated at 800 p.s.i.g. with a hydrogen to hydrocarbon mole ratio of 5:1. The average bed temperature ° F., the hydrogen to hydrogen sulfide mole ratio, the toluene WHSV, and the calculated contact time in seconds are as tabulated infra, as are the percent of theoretical conversion, benzene purity, and percent ethylbenzene in the $C_8$ aromatics.

TABLE

| | Example | | | | | | |
|---|---|---|---|---|---|---|---|
| | 1 [a] | 2 [a] | 3 | 4 | 5 | 6 | 7 |
| Temp., °F | 549 | 590 | 654 | 680 | 708 | 732 | 760 |
| $H_2:H_2S$ | 520 | 180 | 200 | 190 | 165 | 195 | 180 |
| WHSV | 3.1 | 2.9 | 4.9 | 4.7 | 4.7 | 4.5 | 4.8 |
| Time, sec | 29 | 30 | 17 | 17 | 17 | 17 | 16 |
| Percent conv | 76 | 90 | 89 | 91 | 91 | 92 | 94 |
| Benzene purity | 99.36 | 99.54 | 99.80 | 99.84 | 99.87 | 99.92 | 99.90 |
| Percent ethylbenzene in $C_8$ arom | 0.8 | 1.45 | 2.0 | 2.3 | 2.7 | 3.5 | 4.5 |

[a] Control run.

From inspection of the above table it will be apparent that control Examples 1 and 2 (characterized by a calculated contact time of 29 and 30 seconds and by a WHSV of 3.1 and 2.9) yielded benzene having a purity respectively of 99.36% and 99.54%—this is regarded as undesirably low. In contrast, Examples 3-7, which are characterized inter alia by a calculated contact time of less than 20 seconds and a WHSV of at least 4.5, permit attainment of product benzene of purity of 99.80% or better and as high as 99.92%.

A second series of runs was made under comparable conditions as set forth in the following table:

| | Example | | | | | | | |
|---|---|---|---|---|---|---|---|---|
| | 8 | 9 [a] | 10 | 11 | 12 | 13 | 14 | 15 |
| Operating conditions: | | | | | | | | |
| Temp. (°F.) | 648 | 650 | 650 | 620 | 620 | 620 | 640 | 640 |
| Press. (p.s.i.g.) | 800 | 800 | 300 | 800 | 800 | 800 | 800 | 800 |
| WHSV | 6.97 | 1.0 | 1.0 | 8.9 | 10.4 | 5.17 | 10.3 | 5.33 |
| $H_2:HC$ | 8.50 | 15 | 15 | 4.87 | 4.22 | 4.21 | 4.21 | 4.07 |
| Liquid phase analysis, wt. percent: | | | | | | | | |
| Light ends plus naphthenes | 0.26 | 2.38 | 0.40 | 0.44 | 0.26 | 0.43 | 0.21 | 0.37 |
| Benzene | 17.74 | 23.17 | 23.02 | 18.55 | 18.82 | 22.15 | 18.52 | 20.31 |
| Toluene | 57.90 | 42.19 | 45.27 | 56.09 | 56.16 | 48.34 | 56.69 | 52.51 |
| $C_8$ aromatics | 20.84 | 24.91 | 25.81 | 20.90 | 21.33 | 24.26 | 22.24 | 22.78 |
| $C_9$ aromatics | 3.20 | 6.52 | 5.26 | 3.81 | 3.32 | 4.61 | 3.24 | 3.85 |
| $C_{10}$ aromatics | | 0.83 | 0.24 | 0.14 | 0.06 | 0.17 | 0.07 | 0.13 |
| Benzene purity | 99.84 | 99.45 | 99.88 | 99.86 | 99.88 | 99.85 | 99.94 | 99.90 |
| Percent ethylbenzene in $C_8$ arom | 1.18 | 7.3 | 3.24 | 1.41 | | 1.48 | | 1.01 |
| Calc. contact time (sec.) | 7.5 | 34 | 13 | 10 | 9 | 19 | 9 | 18 |
| Percent conversion | 72 | 99 | 77 | 75 | 75 | 89 | 74 | 82 |

[a] Control run.

From the above table, it will be apparent that in control Example 9 using a time of 34 seconds, the benzene purity was undesirably low—99.45%. In experimental Examples 8 and 10-15 (characterized inter alia by contact times of less than twenty seconds) the product benzene had a purity of 99.84% or better.

A further series of control examples was carried out at 800 p.s.i.g. and other conditions as noted in the following table:

TABLE

| | Example | | | |
|---|---|---|---|---|
| | 16 [a] | 17 [a] | 18 [a] | 19 [a] |
| Temp., °F | 590 | 575 | 549 | 600 |
| WHSV | 2.9 | 3.1 | 3.1 | 3.85 |
| Time, sec | 29 | 30 | 30 | 38 |
| $H_2:HC$ | 5.3 | 4.8 | 4.8 | 3.2 |
| Percent toluene in product | 51.9 | 50.9 | 44 | 46.1 |
| Benzene purity, percent | 99.54 | 99.46 | 99.36 | 99.37 |

[a] Control run.

From the above table, it will be apparent, when toluene is disproportionated for a contact time of greater than 20 seconds, that the purity of the product benzene is undesirably low—typically only 99.36%-99.54%.

EXAMPLE 20

Practice of the process of this invention may be carried out in a preferred embodiment in accordance with the flow sheet set forth in the attached drawing.

It will be apparent that the drawing is schematic and may not include details of auxiliary processing equipment such as pumps, heat exchangers, collection vessels, etc.

In practice of the process of this invention in accordance with a specific embodiment, there may be admitted, through line 10, 536 parts of a fresh charge stream containing toluene typically as recovered from the catalytic reforming operation. Fresh charge in line 10 may contain the following components:

TABLE

| Component: | Parts |
|---|---|
| Benzene | 2 |
| Toluene | 531 |
| $C_8$ aromatics | 3 |

To the fresh charge in line 10, there may be added through line 11 a recycle stream containing 454 parts of toluene. The combined charge to disproportionation (990 parts) may be mixed with hydrogen and hydrogen sulfide, schematically shown as being admitted through line 12. The mixture admitted to disproportionation contains hydrogen in ratio of 5 moles of hydrogen per mole of total toluene feed, and 9.5 parts of hydrogen sulfide with 1000 parts of toluene feed.

The catalyst employed is prepared as was the catalyst used in Examples 1–7.

It is a feature of the process of this invention that disproportionation be carried out in this embodiment under the following conditions:

| | |
|---|---|
| Temperature into catalyst bed ° F | 732 |
| Pressure into catalyst bed p.s.i.g | 800 |
| Toluene WHSV (weight hourly space velocity) | 4.5 |
| Mole ratio hydrogen: Hydrogen | 5:1 |
| Mole ratio hydrogen: $H_2S$ | 195:1 |
| Contact time (seconds) | 17 |

Disproportionation occurs in disproportionation operation 13 to yield a product in line 14 which is passed to high pressure separation or flashing operation 15 wherein hydrogen and a portion of the hydrogen sulfide are withdrawn through line 16 and passed to line 17 where they are mixed with make-up hydrogen and hydrogen sulfide admitted through line 18. The mixed gases are moved by compressor 19 through line 12 and thence through line 10 to disproportionation operation 13.

It is a feature of the disproportionation carried out in accordance with the process of this invention that the flashed disproportionated product in line 20 may be characterized by conversion during disproportionation of 53.6% wt. percent of the toluene charge in line 10. This is 92% conversion.

High pressure separator flashed bottoms have the following composition:

TABLE

| Component: | Parts |
|---|---|
| Light ends and naphthenes | 10 |
| Benzene | 224 |
| Toluene | 464 |
| $C_8$ aromatics | 249 |
| $C_9$ aromatics | 51 |
| $C_{10}$ aromatics | 2 |

This stream in line 20 is heated in heat exchanger 21 heated by steam in line 22 and passed to degassing tower 23. Overhead in line 24, including a portion of the hydrogen sulfide, some hydrogen, and benzene is passed through condenser 25, cooled by water in line 26, and then through line 27 to collection drum 28. 1 part of hydrogen sulfide and 10 parts of propane and butanes, non-condensible gases, are withdrawn through line 29 and either recycled to line 18 or more preferably routed to fuel. Benzene condensate is returned to degassing tower 23 through line 30.

Degassing operation bottoms are reboiled in heat exchanger 31 heated by steam in line 32; and net degassed bottoms withdrawn through line 33 include a degassed disproportionated stream having the composition set out in the following table:

TABLE

| Component: | Parts |
|---|---|
| Benzene | 224 |
| Toluene | 464 |
| Aromatics: | |
| $C_8$ | 249 |
| $C_9$ and greater | 53 |
| $C_6$ and $C_7$ naphthenes | 0.16 |
| $C_5$ and $C_6$ paraffins | 0.02 |

Degassed bottoms in line 33 are passed through heat exchanger 34 heated by steam in line 35 and thence to benzene fractionator 36. Overhead is passed through line 37 to condenser 38 cooled by cooling water in line 39, the condensate passing through line 40 to collection drum 41. The composition of condensate in line 42 is as follows:

TABLE

| Component: | Parts |
|---|---|
| Benzene | 224 |
| $C_6$ and $C_7$ naphthenes | 0.16 |
| $C_5$ and $C_6$ paraffins | 0.02 |

A portion of condensate is returned through line 43 as pumped reflux. Product benzene is recovered in amount of 224+ parts in line 44. This product benzene is unexpectedly particularly characterized by its high purity (99.92%) and by its substantial freedom (less than 0.08%) from naphthenes.

Benzene fractionating tower bottoms may be reboiled in heat exchanger 45 heated by steam in line 46. Net bottoms in amount of 766 parts, withdrawn through line 47 may principally contain toluene, $C_8$, and $C_9$ and heavier cuts and more specifically have the following composition:

TABLE

| Component: | Parts |
|---|---|
| Toluene | 464 |
| Aromatics: | |
| $C_8$ | 249 |
| $C_9$ and greater | 53 |

The stream in line 47 is heated in heat exchanger 48 by steam in line 49 and passed to toluene fractionator 50. Overhead in line 51 is condensed in heat exchanger 52 cooled by water in line 55 and passed through line 54 to collection drum 55. Of the condensate in line 56, a portion is passed as pumped back reflux through line 57 to toluene fractionator 50; and a portion is recycled through line 11 to disproportionation operation 13.

Toluene fractionator bottoms are reboiled in heat exchanger 58 heated by steam in line 59. Net bottoms in amount of 302 parts may have the following composition:

TABLE

| Components—aromatics: | Parts |
|---|---|
| $C_8$ | 249 |
| $C_9$ and greater | 53 |

Net bottoms in line 60 are heated in heat exchanger 61 heated by steam in line 62 and passed to xylene fractionator 63. Overhead is withdrawn through line 64, condensed in heat exchanger 65 cooled by water in line 66, and passed through line 67 to collection drum 68. A portion of the condensate is passed through lines 69 and 70 as pumped reflux to xylene fractionator. Net overhead product, withdrawn in amount of 249.0 parts through line 71, a xylene fraction, has the following composition:

TABLE

| Component: | Parts |
|---|---|
| Ethyl benzene | 8.5 |
| Paraxylene | 60 |
| Meta xylene | 130.5 |
| Ortho xylene | 50 |

Xylene fractionator bottoms are reboiled in heat exchanger 74 heated by steam in line 72. Net bottoms in amount of 63 parts are withdrawn through line 73—a motor naphtha having the following composition:

TABLE

| Component: | Parts |
| --- | --- |
| Ethyl toluenes | 10 |
| Mesitylene | 13 |
| Pseudocumene | 33 |
| Hemimellitene | 5 |
| $C_{10}$ aromatics | 2 |

Although this invention has been illustrated by reference to specific embodiments, it will be apparent to those skilled in the art that various changes and modifications may be made which clearly fall within the scope of this invention.

We claim:

1. The method of disproportionating toluene which comprises contacting said toluene, admixed with a sulfide compound, under disproportionation conditions in the presence of, as disproportionation catalyst (a) a mordenite derived hydrogen aluminosilicate having a silica to alumina mole ratio of greater than about 10 to 1, and (b) a sulfided Group VIII metal associated with the aluminosilicate;

maintaining said toluene in contact with said catalyst for a contact time of less than about 20 seconds during disproportionation thereby effecting conversion of greater than 70% of the theoretical conversion of charge toluene to product benzene substantially free of naphthenes boiling within the boiling range of said desired product benzene; and recovering said product benzene substantially free of naphthenes.

2. The method of disproportionating toluene as claimed in claim 1 wherein said contact time is 7-20 seconds.

3. The method of disproportionating toluene as claimed in claim 1 wherein said contact time is about 17 seconds.

4. The method of disproportionating toluene as claimed in claim 1 wherein said charge toluene is contacted with said catalyst at a WHSV of greater than about 4.

5. The method of disproportionating toluene as claimed in claim 1 wherein said charge toluene is contacted with said catalyst at a WHSV of about 4.5-15.

6. The method of disproportionating toluene as claimed in claim 1 wherein disproportionation is carried out at a temperature greater than about 600° F.

7. The method of disproportionating toluene as claimed in claim 1 wherein disproportionation is carried out at 600° F.-800° F.

8. The method of disproportionating toluene as claimed in claim 1 wherein disproportionation is carried out at 620° F.-760° F. at a WHSV of greater than about 4.5.

9. The method of disproportionating toluene which comprises contacting said toluene, admixed with a sulfide compound, under disproportionation conditions in the presence of, as disproportionation catalyst (a) a mordenite derived hydrogen aluminosilicate having a silica to alumina mole ratio of greater than about 10 to 1, and (b) a sulfided Group VIII metal associated with the aluminosilicate;

maintaining said toluene in contact with said catalyst for a contact time of 7-20 seconds at 600° F-760° F. and 300-1000 p.s.i.g. at WHSV of 4.5-15 during disproportionation thereby effecting conversion of greater than 70% of the theoretical conversion of charge toluene to product benzene substantially free of naphthenes boiling within the boiling range of said desired product benzene; and recovering said product benzene substantially free of naphthenes.

10. The method of disproportionating benzene as claimed in claim 9 wherein the effluent from said disproportionation contains less than about 0.2% naphthenes.

11. The method of disproportionating toluene which comprises contacting said toluene, admixed with a sulfide compound, under disproportionation conditions in the presence of, as disproportionation catalyst (a) a mordenite derived hydrogen aluminosilicate having a silica to alumina mole ratio of greater than about 10 to 1, and (b) a sulfided Group VIII metal associated with the aluminosilicate;

maintaining said toluene in contact with said catalyst for a contact time of less than about 20 seconds during disproportionation thereby effecting conversion of greater than 70% of the theoretical conversion of charge toluene to product benzene substantially free of naphthenes boiling within the boiling range of said desired product benzene;

withdrawing effluent from said disproportionation;

separating said effluent into (a) an impure benzene bottoms and (b) a lighter overhead fraction;

rectifying said impure benzene bottoms thereby forming as overhead a high purity benzene product characterized by the presence of less than about 0.2% naphthenes boiling at 150° F.-200° F.; and recovering said high purity benzene product.

References Cited

UNITED STATES PATENTS

| | | | |
| --- | --- | --- | --- |
| 3,409,685 | 11/1968 | Donaldson et al. | 260—668 A |
| 3,463,744 | 8/1969 | Mitsche | 260—672 T |
| 3,476,821 | 11/1969 | Brandenburg et al. | 260—672 T |
| 3,551,510 | 12/1970 | Pollitzer et al. | 260—672 T |
| 3,644,219 | 2/1972 | Mitsche | 252—455 Z |
| 3,677,973 | 7/1972 | Mitsche et al. | 260—672 T |

CURTIS R. DAVIS, Primary Examiner

PO-1050
(5/69)

UNITED STATES PATENT OFFICE
CERTIFICATE OF CORRECTION

Patent No. 3,808,284          Dated April 30, 1974

Inventor(s) Richard C. Wallace and Robert M. Suggitt

It is certified that error appears in the above-identified patent and that said Letters Patent are hereby corrected as shown below:

Col. 1, line 38, "benzene (may" should read --benzene) may--;

Col. 1, line 39
Col. 6, line 23
Col. 6, line 48
    (inter alia" should read --$\underline{inter\ alia}$--;

Col. 5, line 49, correct the formula to read

--$Co(NO_3)_2 \cdot 6H_2O$--;

Col. 6, line 1, "infra." should read --$\underline{infra}$--

Signed and sealed this 24th day of September 1974.

(SEAL)
Attest:

McCOY M. GIBSON JR.
Attesting Officer

C. MARSHALL DANN
Commissioner of Patents